(12) United States Patent
Odell et al.

(10) Patent No.: US 7,275,034 B2
(45) Date of Patent: Sep. 25, 2007

(54) WORD-SPECIFIC ACOUSTIC MODELS IN A SPEECH RECOGNITION SYSTEM

(75) Inventors: Julian J. Odell, Kirkland, WA (US); Shahid Durrani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/403,680

(22) Filed: Apr. 13, 2006

(65) Prior Publication Data

US 2006/0184365 A1    Aug. 17, 2006

Related U.S. Application Data

(63) Continuation of application No. 10/364,084, filed on Feb. 11, 2003, now Pat. No. 7,062,436.

(51) Int. Cl.
*G10L 15/06*    (2006.01)

(52) U.S. Cl. .................................................. 704/255

(58) Field of Classification Search ................ 704/255
See application file for complete search history.

(56) References Cited

U.S. PATENT DOCUMENTS

| | | | |
|---|---|---|---|
| 4,852,180 A | 7/1989 | Levinson ................. | 704/256.4 |
| 5,778,341 A | 7/1998 | Zeljkovic ................. | 704/256 |
| 6,092,042 A | 7/2000 | Iso ........................... | 704/240 |
| 6,356,865 B1 | 3/2002 | Franz et al. .............. | 704/2 |
| 6,374,224 B1 | 4/2002 | Horiguchi et al. ....... | 704/266 |
| 6,442,524 B1 | 8/2002 | Ecker et al. ............. | 704/777 |
| 6,574,597 B1 * | 6/2003 | Mohri et al. ............. | 704/251 |
| 6,662,158 B1 | 12/2003 | Hon et al. ................ | 704/252 |
| 7,062,436 B1 * | 6/2006 | Odell et al. ............. | 704/255 |
| 7,076,422 B2 * | 7/2006 | Hwang ..................... | 704/226 |

OTHER PUBLICATIONS

"*Improvements in Spontaneous Speech Recognition*" by Daben Liu, etc. at Broadcast News Transcription and Understanding Workshop, Feb. 8-11, 1998, sponsored by DARPA.
Application filed for Modeling and Processing Filled Pauses and Noises in Speech Recognition, U.S. Appl. No. 10/388,259, filed Mar. 13, 2003.
Z.Liu, J. Huang, and Y. Wang, "Classification of TV programs based on audio information using hidden Markov model," in IEEE Workshop Multimedia Signal Processing (MMSP-98), Los Angeles, CA, Dec. 7-9, 1998, pp. 27-32. Http://citeseer.ist.psu.edu/article/liu98classification.html.
S.E.Levinson, et al., "Speaker Independent Isolated Digit Recognition Using Hidden Markov Models", pp. 1049-1052, ICASSP 83,Boston, 1983 IEEE.

* cited by examiner

*Primary Examiner*—Susan McFadden
(74) *Attorney, Agent, or Firm*—Joseph R. Kelly; Westman, Champlin & Kelly, P.A.

(57) ABSTRACT

A speech recognizer has an acoustic model that includes word-specific models, that are specific to candidate words. The candidate words would otherwise be mapped to a series of general phones. A decoder transcribes input speech into words formed by shared phones, word-specific phones and a combination of shared word-specific phones.

13 Claims, 8 Drawing Sheets

| TRANSCRIPTIONS | |
|---|---|
| WORD<br>ONE | MONOPHONE<br>w   ax   n |
| | TRIPHONE<br>*-w+ax   w-ax+n   ax-n+* |
| WORD<br>SEPTEMBER | MONOPHONE<br>s  eh   p  t  eh   m  b  eh r |
| | TRIPHONE<br>*-s+eh  s-eh+p  eh-p+t  p-t+eh  t-eh+m  eh-m+b  m-b+eh  b-eh+  eh-r+* |

FIG. 4A

| TRANSCRIPTIONS | |
|---|---|
| WORD<br>ONE | MONOPHONE<br>w      ONE1         n |
| | TRIPHONE<br>*-w+ONE1   w-ONE1+n   ONE1-n+* |
| WORD<br>SEPTEMBER | MONOPHONE<br>s      SEPTEMBER1      SEPTEMBER1      r |
| TRIPHONE<br>*-s+SEPT         s-SEPT1+SEPT2        SEPT1-SEPT2+r       SEPT2-r+* | |

| WORD | TRANSCRIPTION |
|------|---------------|
| C    | s C1 C2 iy    |
| D    | d D1 D2 iy    |

FIG. 6B

| WORD | TRANSCRIPTION |
|------|---------------|
| C    | s   C1   EE1   iy |
| D    | d   D1   EE1   iy |

FIG. 6C

| WORD | TRANSCRIPTION | | | |
|------|---|---|---|---|
| C | *-s+C1 | s-C1+EE1 | C1-EE1+iy | EE1-iy+* |
| D | *-d+D1 | d-D1+EE1 | D1-EE1+iy | EE1-iy+* |

WORD-SPECIFIC ACOUSTIC MODELS IN A SPEECH RECOGNITION SYSTEM

The present application is a continuation of and claims priority of U.S. patent application Ser. No. 10/364,084, filed Feb. 11, 2003, the content of which is hereby incorporated by reference in its entirety.

BACKGROUND OF THE INVENTION

The present invention relates to speech recognition. More specifically, the present invention relates to word-specific acoustic models in a speech recognition system.

A speech recognition system receives a speech signal and attempts to decode the speech signal to identify a string of words represented by the speech signal. Conventional speech recognizers include, among other things, an acoustic model and a language model. The acoustic model models the acoustic features of speech units (such as phonemes). The language model models word order in the training data.

When the speech signal is received, acoustic features are extracted from the speech signal and compared against the models in the acoustic model to identify speech units contained in the speech signal. Once words are identified, the words are compared against the language model to determine the probability that a word was spoken, given its history (or context).

Conventional acoustic models, which model sub-word speech units (such as phonemes), have proven to be relatively accurate. However, it is widely known that acoustic models which model entire words, rather than simply sub-word units, are more accurate (assuming sufficient training data) in recognizing the words which are modeled. This is sometimes referred to as whole word modeling. However, whole word modeling presents its own significant disadvantages. Perhaps one of the largest disadvantages associated with whole word modeling is the model size. There are thousands of words in the English language. In order to obtain a broad coverage whole word acoustic model, at least one acoustic model would need to be trained for each word. This would result in an undesirably large model, and would consume an undesirably large amount of resources during training.

Another significant difficulty presented by whole word acoustic modeling relates to training data sparseness. For example, it is widely held that in order to accurately train an acoustic model, the training data must include several hundred instances of the utterance being modeled. Given the large number of words in the English language, the amount of training data required to accurately model each word would be extremely large, and it is very doubtful that a sufficient amount of training data could be obtained to model each word.

Hence, acoustic models which model sub-word speech units were developed. There are only approximately 40-50 phonemes in the English language. Therefore, the number of acoustic models required to cover the English language is relatively small. Context-dependent phones (such as triphones) have also been developed to improve accuracy. Even the number of triphones required in an acoustic model is drastically lower than would be required for a broad coverage whole word acoustic model. However, as mentioned above, modeling sub-word speech units sacrifices accuracy.

SUMMARY OF THE INVENTION

An acoustic model includes word-specific models, that model phones specific to candidate words. The candidate words would otherwise be mapped to a series of models that model general phones. A sub-series of the general phones representing the candidate word is modeled by at least one new phone. The new phone model represents a new phone that is dedicated to the candidate word, or a small group of similar words, but the new phone model is not shared among all words that have sections that map to the same sub-series of general phones.

This allows the system to demonstrate improved performance on recognition tasks which contain the candidate words that have been represented in the acoustic model by word-specific phone models. Such candidate words may include, for example, letters, digits, natural numbers, dates and command and control type tasks, by way of example.

The word-specific models can be used in an acoustic model set along side natural triphone based Hidden Markov Models (HMMs). The word-specific acoustic models can comprise HMM chains that represent a phonetic sequence dedicated to one word, or to a small set of similar words, or similar candidate words.

In addition, the new set of models can have a controlled topology.

BRIEF DESCRIPTION OF THE DRAWINGS

FIGS. 4A and 4B illustrate a lexical transcription representing models found in an old and new acoustic model, respectively.

FIG. 6 illustrates clustering performed in accordance with one embodiment of the present invention.

DETAILED DESCRIPTION OF ILLUSTRATIVE EMBODIMENTS

The present invention deals with an acoustic model. However, prior to discussing the acoustic model in detail, a description of one environment in which the present invention can be used is discussed.

Figure 1:
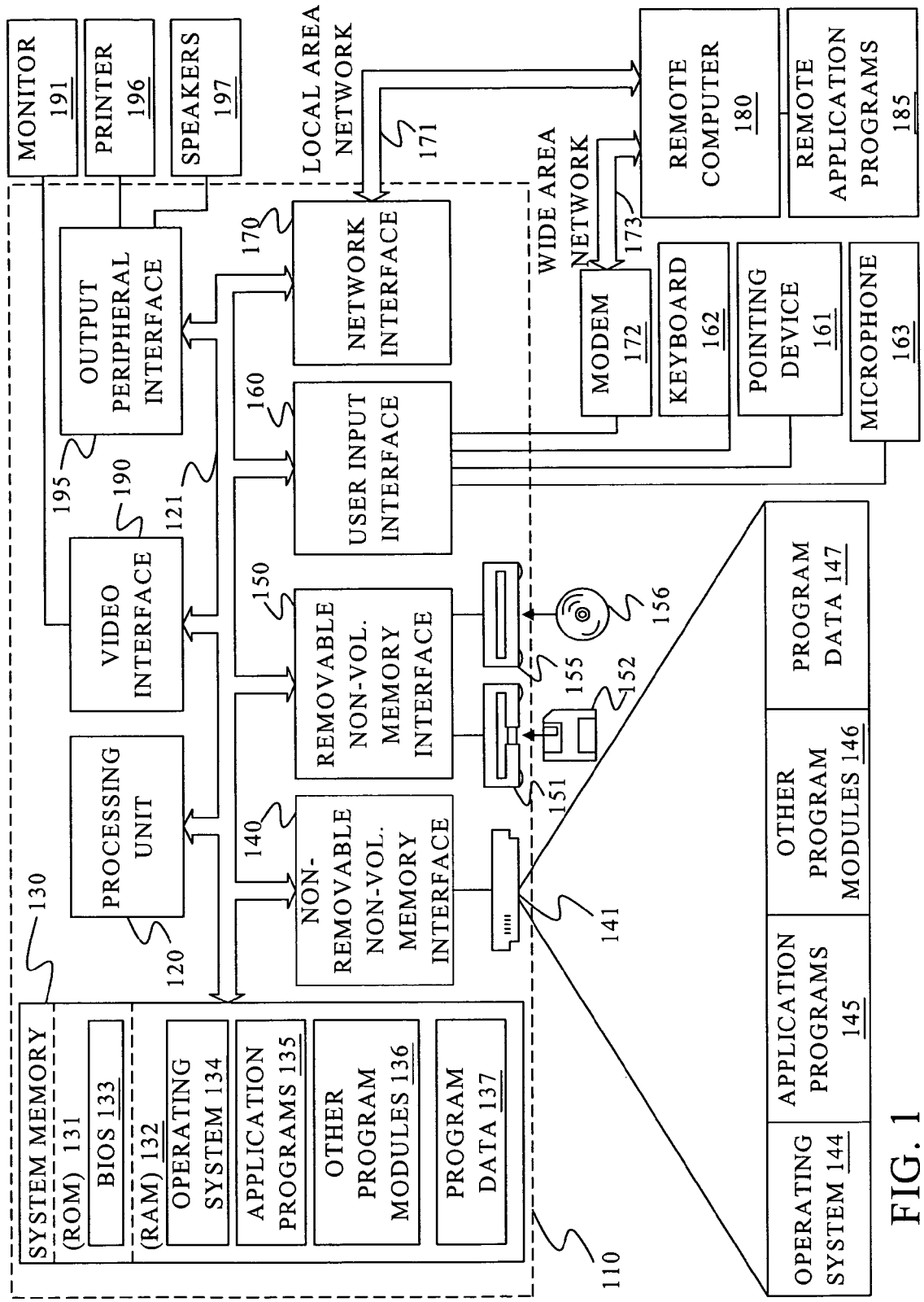
FIG. 1 is one exemplary embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
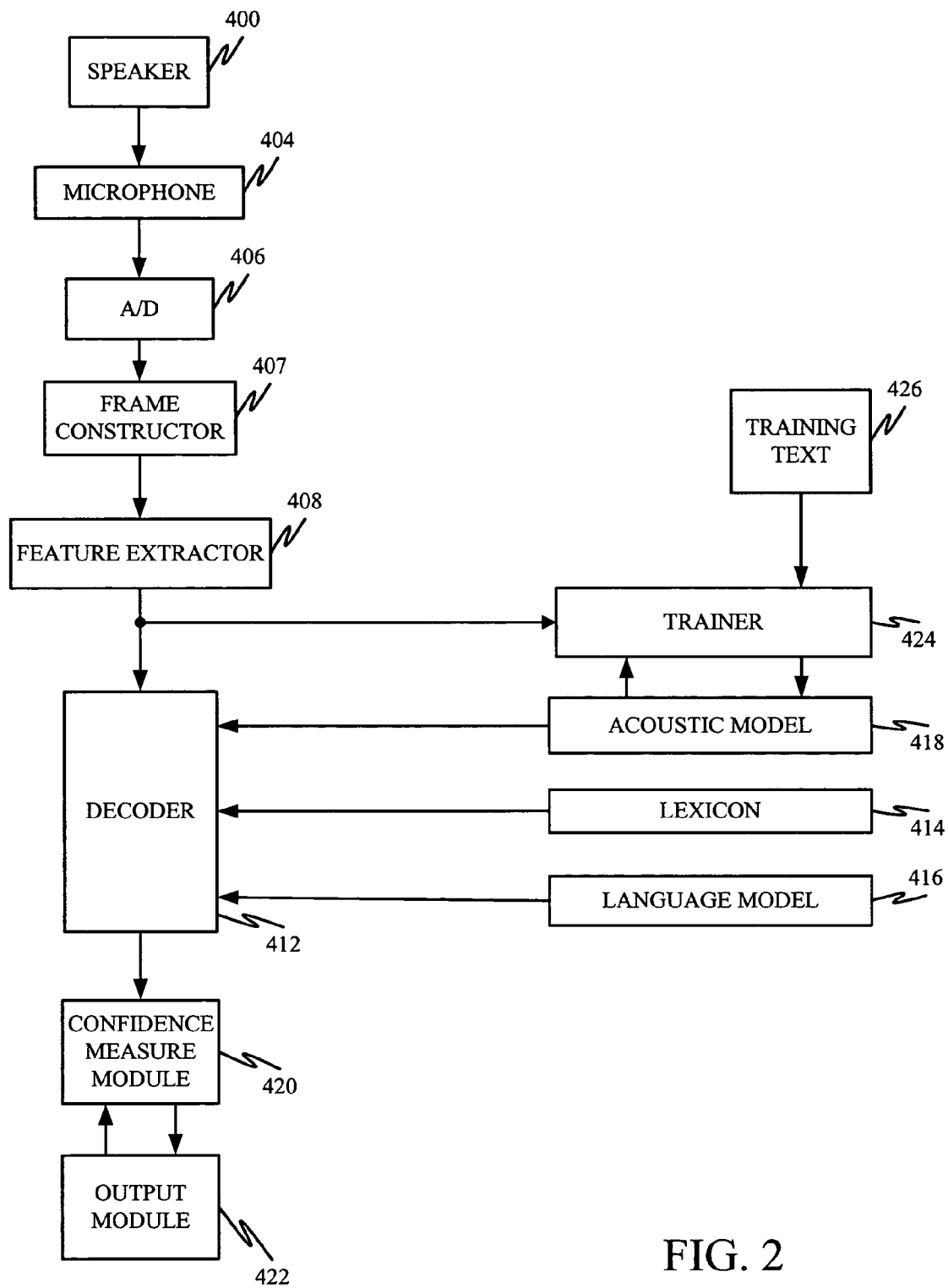
FIG. 2 is a block diagram of a speech recognition system showing an acoustic model in accordance with one embodiment of the present invention.

FIG. 2 provides a block diagram of an environment in which an acoustic model of the present invention may be utilized to perform speech recognition. In FIG. 2, a speaker 400 speaks into a microphone 404. The audio signals detected by microphone 404 are converted into electrical signals that are provided to analog-to-digital (A-to-D) converter 406.

A-to-D converter 406 converts the analog signal from microphone 404 into a series of digital values. In several embodiments, A-to-D converter 406 samples the analog signal at 16 kHz and 16 bits per sample, thereby creating 32 kilobytes of speech data per second. These digital values are provided to a frame constructor 407, which, in one embodiment, groups the values into 25 millisecond frames that start 10 milliseconds apart.

The frames of data created by frame constructor 407 are provided to feature extractor 408, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module 408 produces a stream of feature vectors that are each associated with a frame of the speech signal. This stream of feature vectors is provided to a decoder 412, which identifies a most likely sequence of words based on the stream of feature vectors, a lexicon 414, a language model 416, and the acoustic model 418. The particular method used for decoding is not important to the present invention and any of several known methods for decoding may be used.

The most probable sequence of hypothesis words can be provided to an optional confidence measure module 420. Confidence measure module 420 identifies which words are most likely to have been improperly identified by the speech recognizer. This can be based in part on a secondary acoustic model (not shown). Confidence measure module 420 then provides the sequence of hypothesis words to an output module 422 along with identifiers indicating which words may have been improperly identified. Those skilled in the art will recognize that confidence measure module 420 is not necessary for the practice of the present invention.

During training, a speech signal corresponding to training text 426 is input to decoder 412, along with a lexical transcription of the training text 426. Trainer 424 trains acoustic model 418 based on the training inputs.

Acoustic model 418 includes Hidden Markov Model (HMM) chains that acoustically represent sub-word speech units. For purposes of this discussion, all sub-word speech units will be referred to as phones. Phones will include phonemes, context dependent phones and other sub-word speech units. For a certain set of words (hereinafter referred to as candidate words) acoustic model 418 also includes word-specific models, that are specific to the candidate words, and that are used along side normal phone-based or triphone-based acoustic models. Of course, such phone-based models can include not only monophone or triphone models but any other contextual phone as well, such as bi-phone, quadphone, quinphone, etc . . .

Figure 3:
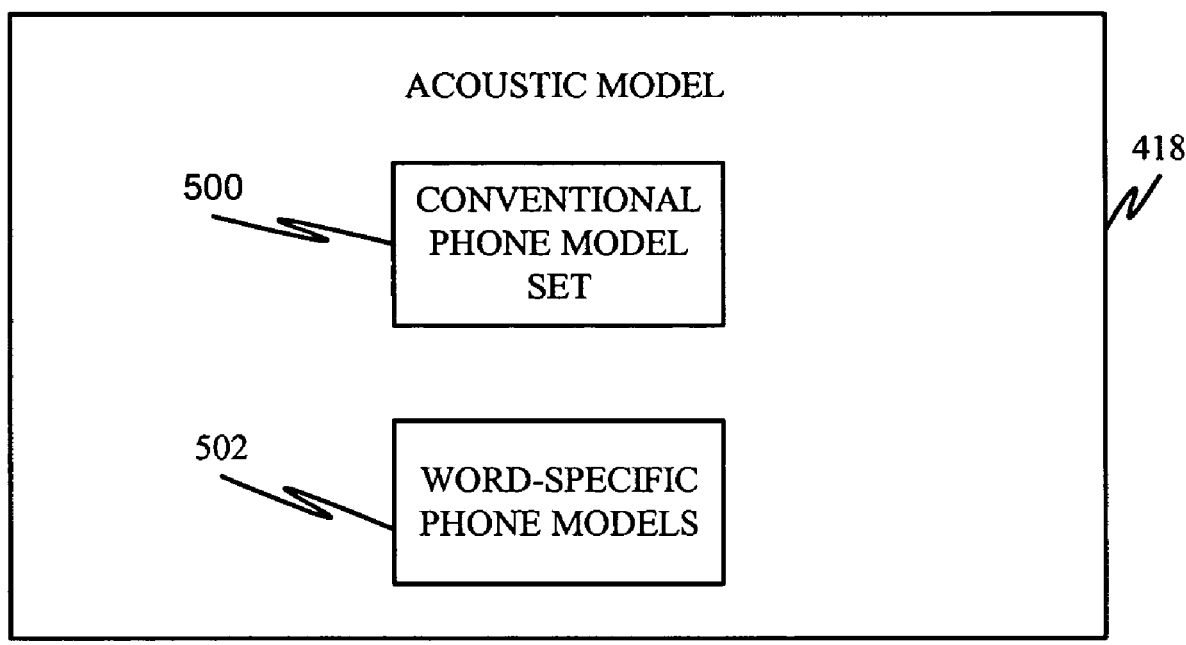
FIG. 3 is a more detailed block diagram of the acoustic model shown in FIG. 2.

FIG. 3 is a block diagram that better illustrates acoustic model 418, in greater detail. As FIG. 3 illustrates, acoustic model 418 not only includes a conventional set of models 500 which model the conventional phones (or phonemes or triphones) in the language of interest, but model 418 also includes acoustic models 502 of word-specific phones. As mentioned, these word-specific phones are illustratively an entirely new set of phones for the candidate words. Each word-specific phone model 502 is an HMM chain that is specific to (trained only on data from and used only in the transcription for) the candidate word, or a very small group of similar candidate words. Models 502 are illustratively not used in lexical entries for non-candidate words, except that derived forms of the candidate words may also include models 502.

In one embodiment, models 502 are presented for particularly significant words in order to reduce confusion of those significant words (i.e., the candidate words) with other words. The lexical transcription of the candidate words will thus constitute a sequence of one or more word-specific phones modeled by models 502, and may also include some conventional phone models 500, particularly if the word is a derived form of a candidate word.

Any desired candidate words can be selected. However, it has been found that a number of factors can illustratively be used in candidate word selection. For instance, one consideration in whether to identify a word as a candidate word is the importance of the word in an application with which the speech recognition system is used. Some categories that may lend themselves to word-specific modeling are digits, numbers, letters, dates (months and days) and words that correspond to command and control type tasks. Another consideration in determining whether to make a word a candidate word relates to the amount of training data available for the candidate word. It has been found that a total number of occurrences of a candidate word in the training data should be at least approximately 300-400. This threshold is exemplary only, and substantially any other desired threshold can be used as well. However, if the candidate word frequency in the training data should drop below the selected threshold, the word-specific models can share training data with other models, illustratively models corresponding to the lexical transcription of similar candidate words, or a very small set of other similar words. Similarly, it is believed that function words are not good candidate words, even though they generally have quite high frequency in training corpora.

In order to better illustrate acoustic model 418, FIGS. 4A and 4B show a lexical transcription for the words "one" and "September" first using phones modeled in a conventional acoustic model (in FIG. 4A) and then using phones modeled in acoustic model 418 in accordance with one embodiment of the present invention. The lexical transcriptions (i.e., the lexicon) is given for both words in instances in which the acoustic model contains monophone models, and in which the acoustic model contains context-dependent models (such as triphones).

As can be seen in FIG. 4A, the word "one" is represented in a monophone acoustic model by three distinct, conventional phones: "w", "ax", "n". Each of these phonemes is represented in the acoustic model by a Hidden Markov chain, which has, for example, three emitting states. The word "one" is also represented in the triphone model by three acoustic models, each of which corresponds to a context-dependent phone such as a triphone. The asterisk indicates that its position in the triphone can be occupied by any other allowed phone. Therefore, the three triphones that represent the word "one" in the acoustic model correspond to "*–w+ax", "w–ax+n", and "ax–n+*".

FIG. 4A also shows monophone and triphone entries for the word "September". As shown, the monophone acoustic model uses nine HMM chains (in which the "eh" phone is used three times) to represent the word "September". FIG. 4A also shows the triphones which the nine HMM chains represent in order to model the word "September" in the context-dependent acoustic model.

FIG. 4B illustrates lexical transcriptions for the acoustic models contained in acoustic model 418, assuming that the words "one" and "September" are candidate words and are thus to be represented by word-specific acoustic models. Again, FIG. 4B shows the acoustic model both in the instance in which it contains monophone models and in the instance in which it contains context dependent (e.g., triphone) models. In the monophone transcription of the word "one", it can be seen that the word is again represented by three HMM chains. Also, it can be seen that the first and last acoustic "w" and "n" are modeled by conventional acoustic models which can share training data across a variety of other words and which can be used in transcriptions of other words.

However, the central phone is modeled by acoustic model "ONE1" which is a word-specific acoustic model trained only on instances of the word "one" in the training data. Therefore, the acoustic models associated with the phones "w" and "n" correspond to the conventional phone model set 500 in FIG. 3 while the acoustic model corresponding to the new phone "ONE1" corresponds to the word-specific phone models 502 shown in FIG. 3.

In the triphone model, the candidate word "one" is represented by three word-specific models, two outer models and a central model. The two outer models are illustrated in FIG. 4B by the transcriptions "*–w+ONE1" and "ONE1–n+*". The central model is represented in FIG. 4B by "w–ONE1+n". The outer models offer entry and exit points into and out of the central model. The outer models behave as specialized triphones whose inner context is the central section while the outer context (represented by "*" is chosen from the normal phonetic system. This allows the word-specific phone models 502 to be used in a conventional triphone system. The left and right context of the outer models can correspond to any of the conventional phone models in set 500. However, the remaining portion of the transcriptions of the triphones render the triphones word-specific, because each includes (either as context or as the base phone) the "ONE1" phone.

The word-specific models in accordance with the present invention can also be used to more accurately model duration. This is better illustrated with respect to the new lexical transcriptions shown in FIG. 4B. More than one word-specific model can be used for longer words to better model duration. In the monophone for the word "one", since the duration of the word "one" is relatively short, there is only one word-specific model corresponding to the phone "ONE1". Similarly, in the triphone model, there is only one model with the word-specific phone "ONE1" as its base phone. However, FIG. 4B also shows that, in the monophone model, the word "September" is represented by four phones: an entry phone "s", two word-specific phones "SEPTEMBER1" and "SEPTEMBER2" and an exit phone "r". This is as opposed to the one word-specific phone "ONE1" found in representing the word "one". Similarly, in the triphone model, there are two models that have, as their base phones, the word-specific phones, namely, "s-SEPTEMBER1+SEPTEMBER2" and "SEPTEMBER1–SEPTEMBER2+r".

Of course, the duration of the word can depend on the type of word. For example, vowels typically have a much longer pronunciation than consonants. Therefore, the self-loop probability in the HMM chain is much higher for vowels than it is for consonants. In the present invention, the lexical transcription in the lexicon can be changed depending on how long the word is. For shorter words, perhaps only a single word-specific phone will be used, while for longer words, multiple word-specific phones can be used.

Also, of course, the number of word-specific phones modeled for any word can vary widely, depending on the duration. Since September is a relatively long word, it may actually be modeled by three or more word-specific phones. In any case, the number of word-specific phones can be chosen to better model duration.

One embodiment of the number of HMM chains (word-specific phones) used to represent a candidate word, in relation to the duration of pronunciation of the candidate word, is shown in Table 1. Of course, it should be noted that this is but one general example of how the number of HMM chains relates to word duration, and any other desired relation can be used as well.

TABLE 1

| Candidate word duration (sec) | Number of HMMs |
| --- | --- |
| 0.20–0.30 | 3 |
| 0.30–0.41 | 4 |
| 0.41–0.52 | 5 |
| 0.52–0.60 | 6 |
| 0.60–0.70 | 7 |

Figure 5:
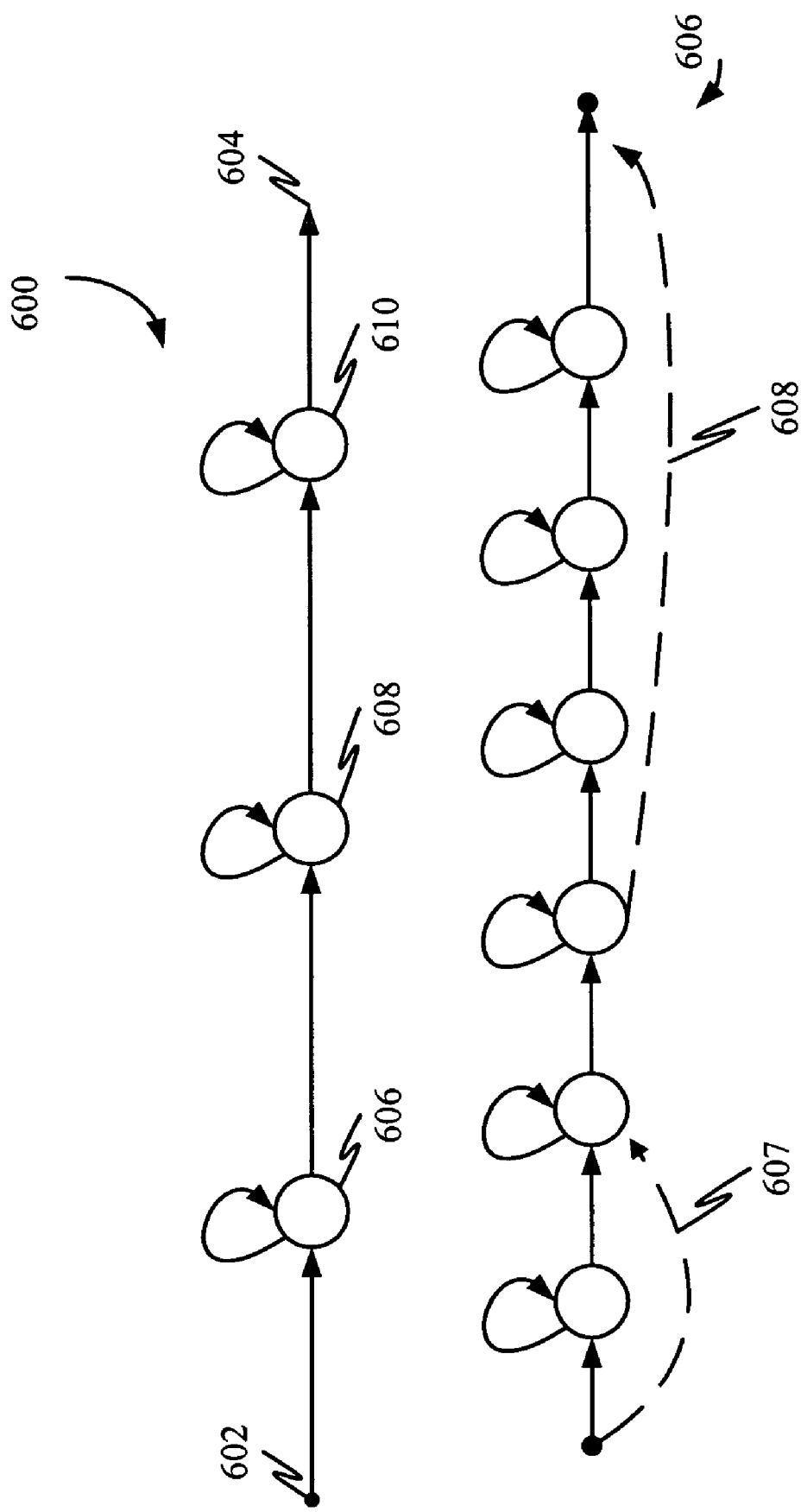
FIG. 5 is a block diagram illustrating controlled variation of the acoustic model topology in accordance with one embodiment of the present invention.

FIG. 5 illustrates that the topology of the word-specific models can be varied as well. FIG. 5 illustrates a conventional three-state HMM chain 600. As is known, a three-state HMM chain includes a start node 602, an end node 604 and three emitting states 606, 608 and 610. As is also well known, the arrows represent probabilities of remaining in a given state (the self-loop probability), or transitioning to a next state (the transition probability).

FIG. 5 also illustrates a HMM chain in accordance with one embodiment of the present invention. It can be seen that the topology of HMM chain 606 is different from that of conventional HMM chain 600. HMM chain 606 not only has a different number of emitting states (it has six emitting states versus three in chain 600) but it also allows for optional transitions represented by dashed arrows 607 and 608. Transitions 607 and 608 may be allowed, for instance, in a word that has two pronunciations, one of which is very slow and the other of which is relatively fast. Transition 607 provides for a transition from outside HMM chain to a central emitting state thereof, and transition 608 provides for a transition from a central emitting state in HMM chain 606 to the ending node (i.e., from the center of HMM chain 606 out of the model). Also, arrow 609 shows that transitions can also be provided from higher order states to lower order states.

Of course, the example illustrated in FIG. 5 is simply provided to show that the topology of each model can be varied, as desired, up to a fully ergodic topology. Any other topological changes can be made as well, or the models of the present invention can maintain the traditional three-state Hidden Markov chain topology.

FIG. 6 illustrates a situation in which it may be desirable, in some limited cases, to do a limited amount of training data sharing among the phones being modeled. FIG. 6A shows a lexical transcription for the letter "c" and for the letter "d". The transcription for each letter includes two word-specific phones (C1 and C2 for the letter "C", and D1 and D2 for the letter "D"). These phones correspond, of course, to two word-specific central models for each word.

However, it can readily be determined that the distinction between the two words actually resides in the first part of each word (such as in the phone sequences "s C1" and "d D1". It will be seen from the data representing the acoustic models that the acoustic models for the phones "C2" and "D2" are very similar and can be replaced as shown in FIG. 6B by a single acoustic model corresponding to the word-specific phone "EE1".

FIG. 6C shows the triphones corresponding to the lexical transcription of the words "c" and "d" this replacement is made. FIG. 6C shows that in the last two triphones of each lexical transcription, the only difference is in the left context of the penultimate triphone in each transcription, although those triphones both have the same base phones. The last triphones in the transcriptions are identical. Since the last triphones are identical, they can be clustered (i.e., they can share all training data). In the penultimate triphones, since they have the same base phone and only a different context (e.g., a different left context) it may be possible to cluster them and tie some of the states together so that some or all of the states can share training data.

Therefore, in accordance with one embodiment of the present invention, a conventional clustering algorithm can be run on both of the last two triphones in each lexical transcription in order to attempt to tie certain states of the HMM chains representing those triphones so that they can share training data. By requiring the base phone to be identical and only the left or right context to be different prior to clustering, this ensures that triphones will not share training data unless the words are highly similar to one another.

A further constraint can be placed on the clustering algorithm such that only data associated with similar candidate words is shared among word-specific models. This further increases the likelihood that the models will be trained on only similar words. Of course, different or additional clustering constraints can be used as well, as desired.

Figure 7:
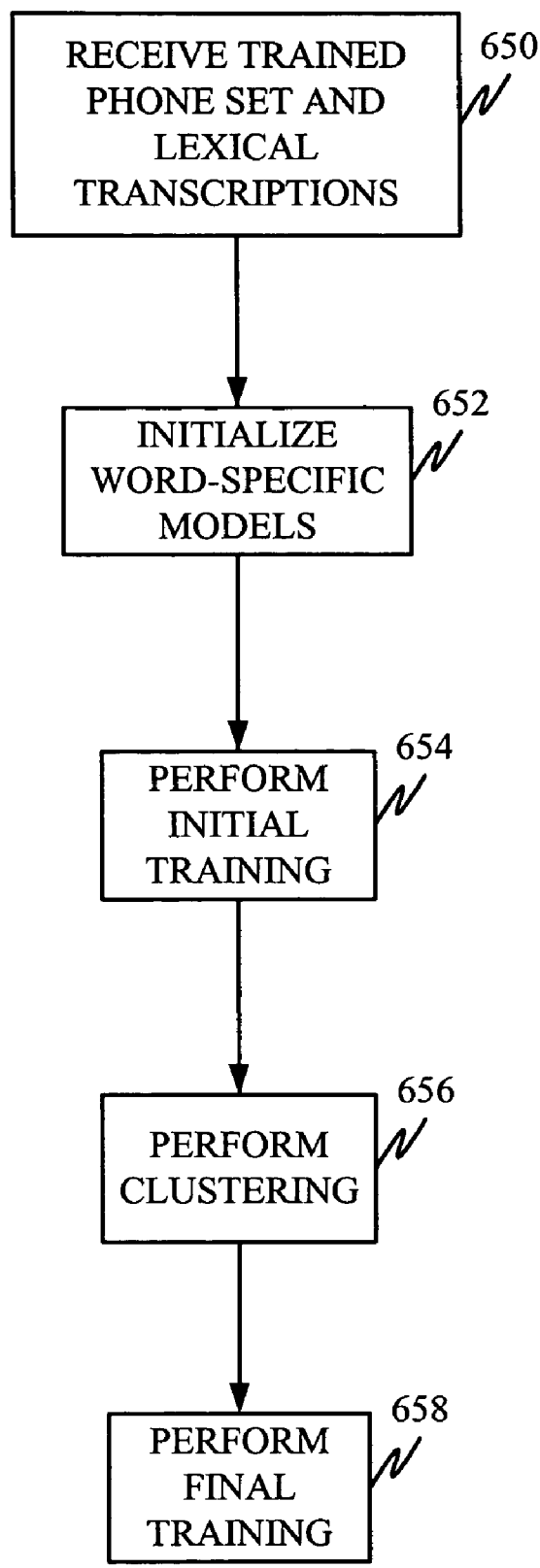
FIGS. 7 and 8 illustrate how acoustic models in accordance with the present invention can be trained.
Figure 8:
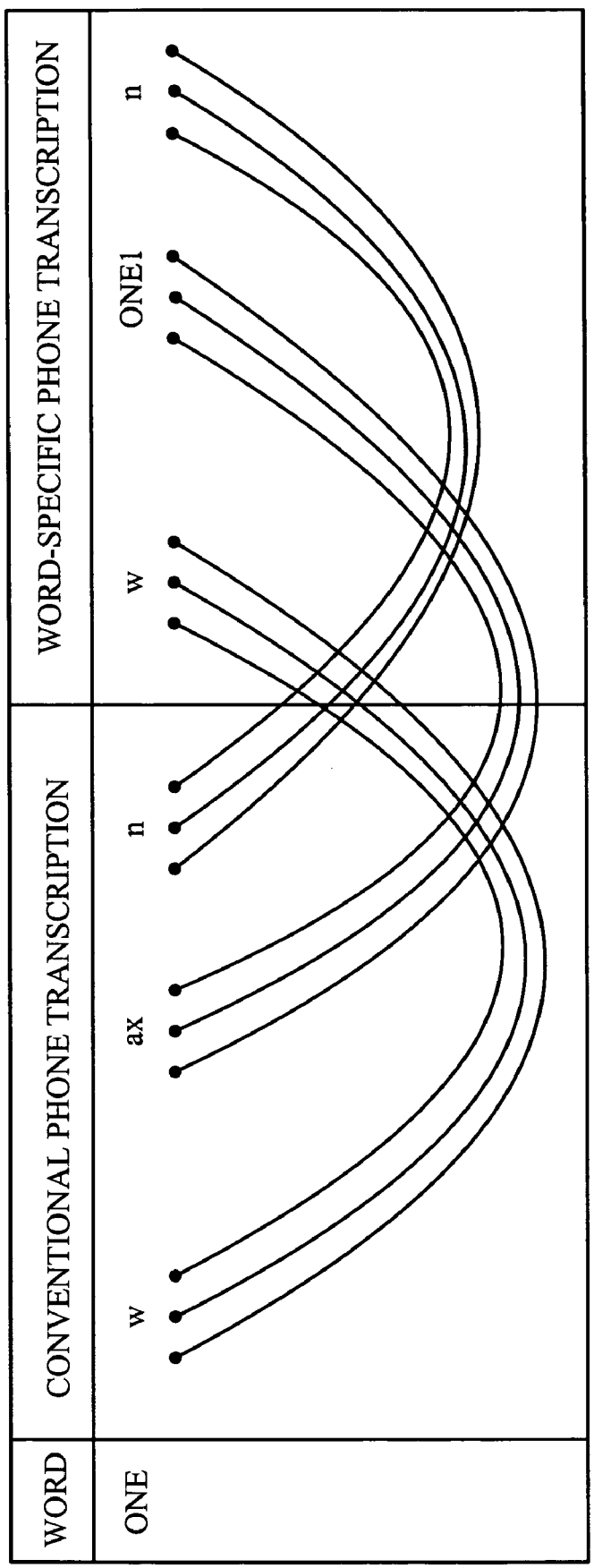

FIGS. 7 and 8 illustrate one exemplary technique for initializing and training word-specific acoustic models. First, in accordance with one embodiment, the conventional lexical transcription for each candidate word is received. This is indicated by block 650 in FIG. 7. The initial conventional acoustic models corresponding to the phones in the lexical transcriptions are also obtained. It should be noted that these initial conventional acoustic models and the lexical transcriptions could also be developed through conventional training techniques as well. However, in accordance with one embodiment, trained, conventional acoustic models corresponding to the lexical phone transcriptions of the candidate words are already available and are simply received.

In any case, the word-specific models are then initialized. This is indicated by block 652 in FIG. 7 and is better illustrated in FIG. 8. FIG. 8 shows, on the left-hand side, the lexical phone transcription associated with the word "one". Below each conventional phone are three small circles representing the three states of the HMM chain corresponding to each conventional acoustic model for the phone. The data corresponding to each state is simply copied over (or smeared) to generate an initial HMM corresponding to each phone in the new lexical phone transcription, which includes the word-specific phone "ONE1". During this smearing process, conventional model states may be copied into multiple target states. However, all conventional states need not be copied to target states. For example, there are may be different numbers of source and target states so not all target states would be copied from conventional states. Other reasons may exist as well for not copying conventional source states to all target states. In addition, smearing can be used for target states belonging to more than one central section of the word specific models.

Once the word-specific models have been initialized, initial training is performed on the models. This is indicated by block 654 in FIG. 7. The initial training simply begins training the word-specific models and trains other acoustic models, based on the training data, given any desired constraints. For example, the word-specific models can be trained using only training data that comes from instances of the candidate word.

Next, clustering can be performed. In accordance with one embodiment of the present invention, the central word-specific sections of each model are clustered using data driven clustering. The clustering involves tying states of similar models, as is done in conventional clustering techniques.

Again, any desired clustering constraints can be used. The outer or interface sections of each model can be clustered using decision tree clustering. However, the tree based clustering, if it is used, is carried out in a slightly different way than in conventional clustering techniques. First, for the left interface section of the model, the right context is given as the first central section of the word-specific sequence. For the right interface section, the left context is given as the last central section of the word-specific sequence. Thus, the decision tree clustering takes place as normal, except that the context information is set instead of variable. Clustering is indicated by block 656 in FIG. 7.

A final training and smoothing stage can then be implemented in which word-specific senones (i.e., states of a word-specific HMM chain) may be clustered with conventional triphone model senones. This is indicated by block 658 and is illustratively only carried out if the occupancy counts for candidate word corresponding to the word-specific models drop below a preset limit (which may be 300-500, or any other desired limit). In such a case, the word-specific senones are tied with the original initializing senones, or any other conventional triphone model senones, based on a conventional data driven clustering approach.

The complete acoustic model can be trained at the same time (i.e., the word-specific models can be trained at the same time as the conventional phone-based models) using a transcription that has conventional phone-based transcriptions for the non-candidate words and word-specific phone-based transcriptions for the candidate words. Derived forms of candidate words may also have word-specific pronunciations.

It should also be noted that the final lexicon (and corresponding acoustic model) may contain both conventional triphone transcriptions for a candidate word and word-specific transcriptions. The acoustic model can be tested to determine which of the transcriptions and corresponding models to maintain, or whether to maintain both. For example, if the conventional triphone HMM chains are picked by the decoder over word-specific HMM chains, then if the conventional HMM chains are picked incorrectly, the corresponding phones should be removed from the lexicon. If the conventional HMM chains are picked correctly, while the word-specific chains are picked incorrectly, then the word-specific HMM chains and phones should be removed from the lexicon, and probably from the acoustic model as well. If the conventional HMM chains are picked correctly, a significant number of times, while the word-specific HMM chains are also largely picked correctly, then both transcriptions and corresponding models can remain. If the conventional triphone HMM chains are not picked at all (or are picked correctly, a very small number of times), then the conventional HMM chains can be removed from the system. Of course, these are guidelines only and any other desired technique can be implemented for choosing which HMM chains to maintain in the lexicon and in the acoustic model.

Although the present invention has been described with reference to particular embodiments, workers skilled in the art will recognize that changes may be made in form and detail without departing from the spirit and scope of the invention.

What is claimed is:

1. A speech recognition system, comprising:
   an input component configured to receive a signal indicative of speech;
   a lexicon including words transcribed by phones;
   an acoustic model modeling shared phones shared among the words in the lexicon and word-specific phones shared among a selected subset of words that would otherwise be lexically transcribed with shared phones;
   a language model modeling word order; and
   a decoder coupled to the input component, the acoustic model and the language model and configured to transcribe speech in the signal into words, the words being formed by shared phones, word-specific phones, and a combination of shared phones and word-specific phones.

2. The speech recognition system of claim 1 wherein the word-specific phones are modeled in the acoustic model by a plurality of word-specific models, each word-specific model modeling a word-specific phone representing a transcription of a portion of a word in the lexicon, the word-specific phone replacing in a transcription of the word one or more of the shared phones, the word-specific phone being shared by fewer than all words in the lexicon that can be transcribed by the shared phones replaced by the word-specific phone.

3. The speech recognition system of claim 1 wherein the word-specific phones include context dependent word-specific phones.

4. The speech recognition system of claim 3 wherein the context-dependent word-specific phones include word-specific phones having left and right context corresponding to shared phones.

5. An acoustic model in a speech recognition system having a lexicon in which words map to phones modeled in the acoustic model, comprising:
   a plurality of shared phone models modeling a plurality of shared phones used to transcribe words in the lexicon, the shared phone models being shared among words in the lexicon; and
   a plurality of candidate word models, each candidate word model modeling a word-specific phone representing a transcription of a portion of a candidate word in the lexicon, the word-specific phone replacing in a transcription of the candidate word one or more of the shared phones, the word-specific phone and the candidate word model being shared by fewer than all words in the lexicon that can be transcribed by the shared phones replaced by the word-specific phone, the shared phone models and the candidate word models being configured such that the lexicon maps one or more individual words to a combination of shared phones and word-specific phones.

6. The acoustic model of claim 5 wherein the candidate word is transcribed by a combination of one or more word-specific phones and one or more shared phones, and wherein the acoustic model includes a candidate word model modeling each of the word-specific phones.

7. The acoustic model of claim 5 wherein the candidate word is transcribed by a plurality of word-specific phones and wherein the acoustic model includes a candidate word model modeling each of the word-specific phones.

8. The acoustic model of claim 5 wherein the word-specific phone is a monophone.

9. The acoustic model of claim 5 wherein the word-specific phone is a context dependent phone.

10. The acoustic model of claim 5 wherein each candidate word model is shared only among a subset of other candidate words.

11. A method of recognizing speech, comprising:
    receiving an input speech signal;
    accessing an acoustic model and a lexicon, the lexicon having words formed of phones modeled in the acoustic model, and the acoustic model including a plurality of shared phone models modeling shared phones used to form words in the lexicon and that are shared among the words in the lexicon, the acoustic model further including a plurality of word-specific phone models, each word-specific phone model modeling a word-specific phone that is used to replace a shared phone in a portion of a candidate word in the lexicon, the word-specific phone being shared by fewer than all words in the lexicon that can be formed with the shared phone replaced by the word-specific phone; and
    generating a textual output including at least one word corresponding to the speech signal, the word being formed of at least one shared phone and at least one word-specific phone.

12. The method of claim 11 wherein generating a textual output comprises:
    generating the textual output including at least one word formed of only word-specific phones.

13. The method of claim 11 wherein generating a textual output comprises:
    generating the textual output including at least one word formed of only shared phones.

* * * * *